United States Patent
Gasca et al.

(10) Patent No.: US 6,895,155 B2
(45) Date of Patent: May 17, 2005

(54) METHOD OF FABRICATING AN OPTICAL FIBER WITH MICROSTRUCTURES

(75) Inventors: Laurent Gasca, Villebon sur Yvette (FR); Gilles Melin, Orsay (FR); Xavier Rejeaunier, Linas (FR); Simon Lempereur, Villejuif (FR); Christine Moreau, Palaiseau (FR); Anne Fleureau, Grez sur Loing (FR)

(73) Assignee: Alcatel, Paris (FR)

( * ) Notice: Subject to any disclaimer, the term of this patent is extended or adjusted under 35 U.S.C. 154(b) by 69 days.

(21) Appl. No.: 10/643,937

(22) Filed: Aug. 20, 2003

(65) Prior Publication Data

US 2004/0062499 A1 Apr. 1, 2004

(30) Foreign Application Priority Data

Aug. 22, 2002 (FR) .............................. 02 10474

(51) Int. Cl.⁷ ................................. G02B 6/02
(52) U.S. Cl. .................... 385/125; 385/123; 385/12; 65/385
(58) Field of Search ................... 385/125, 126, 385/123, 1, 4, 12, 13; 65/385

(56) References Cited

U.S. PATENT DOCUMENTS

| 5,246,647 A | * | 9/1993 | Beck et al. ............... 264/41 |
| 5,702,497 A | * | 12/1997 | Oh et al. ................. 65/412 |
| 6,705,126 B2 | * | 3/2004 | Paek et al. ............... 65/395 |
| 2001/0029756 A1 | * | 10/2001 | Paek et al. ............... 65/395 |
| 2002/0118938 A1 | * | 8/2002 | Hasegawa et al. ......... 385/125 |
| 2003/0159468 A1 | * | 8/2003 | Zeng et al. ................ 65/86 |
| 2004/0011082 A1 | * | 1/2004 | Paek et al. ............... 65/489 |

FOREIGN PATENT DOCUMENTS

| EP | 0 810 453 A1 | 12/1997 | |
| EP | 1 234 806 A2 | 8/2002 | |
| JP | 402243532 A | * 9/1990 | ......... C03B/37/029 |
| JP | 1234806 | * 2/2004 | ......... C03B/37/012 |
| WO | WO 00/60388 A1 | 10/2000 | |

* cited by examiner

*Primary Examiner*—K. Cyrus Kianni
(74) *Attorney, Agent, or Firm*—Sughrue Mion, PLLC

(57) ABSTRACT

An optical fiber with microstructures comprises a plurality of capillary tubes disposed around a central rod and including a self-cleaning layer including molecules able to react with hydroxyl molecules to produce volatile gaseous substances.

15 Claims, 2 Drawing Sheets

FIG_1
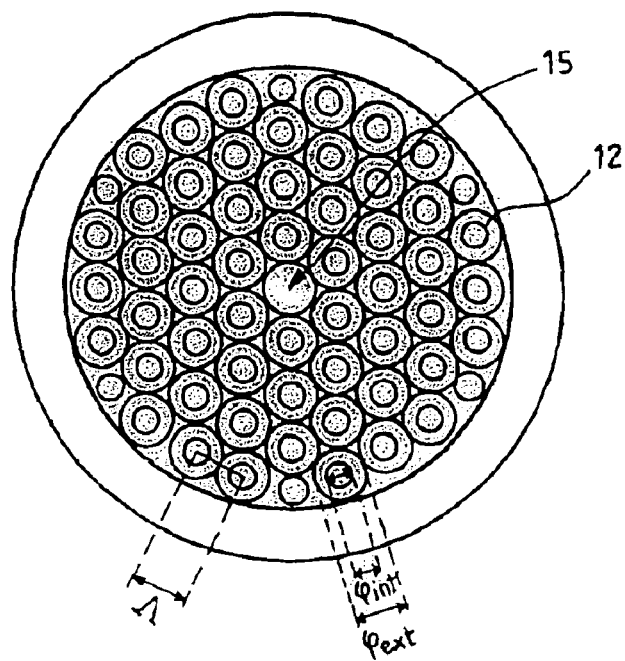
FIG_2
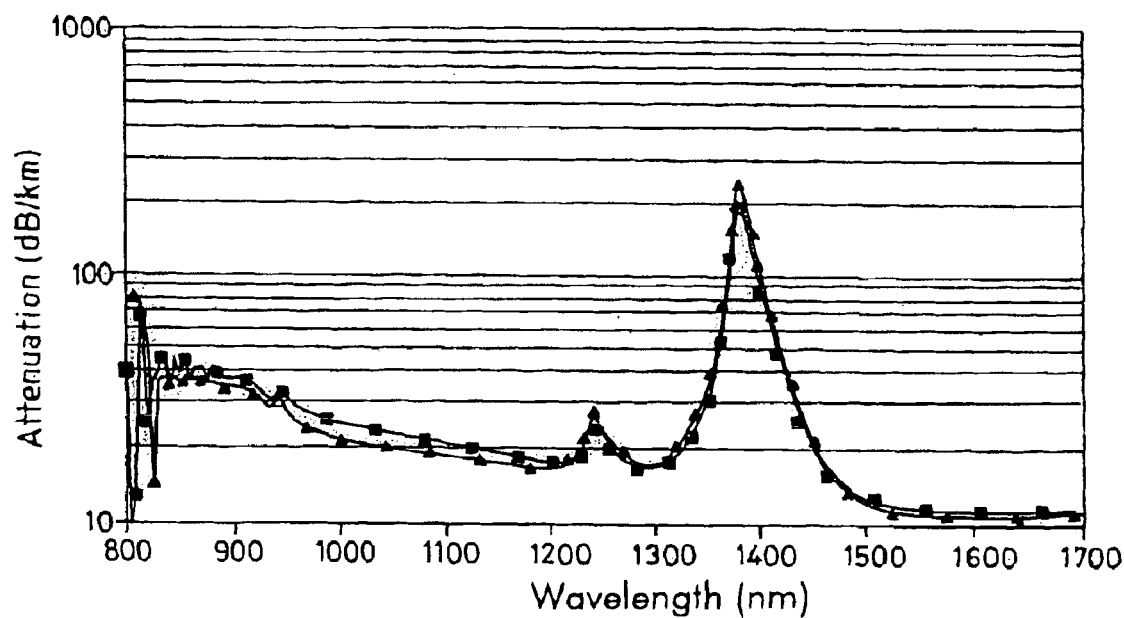

FIG_3
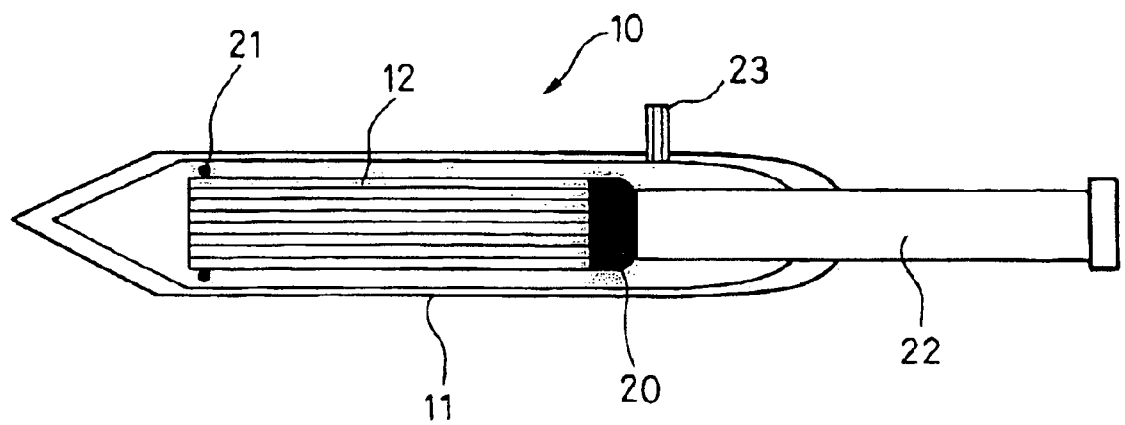
FIG_4
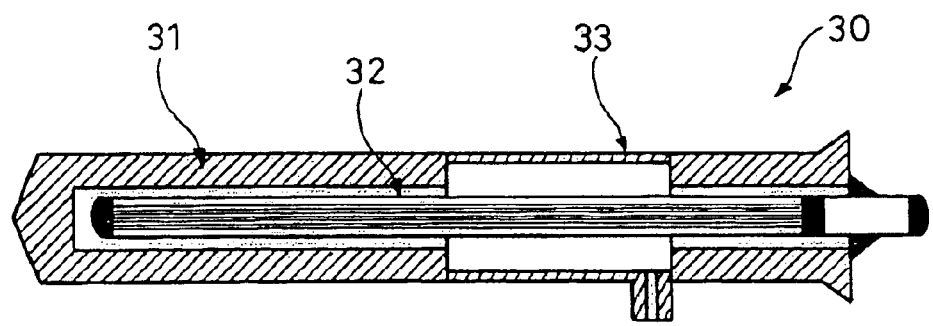

METHOD OF FABRICATING AN OPTICAL FIBER WITH MICROSTRUCTURES

CROSS-REFERENCE TO RELATED APPLICATIONS

This application is based on French Patent Application No. 02 10 474 filed Aug. 22, 2002, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of fabricating an optical fiber with longitudinal holes.

2. Description of the Prior Art

A fiber with holes conventionally consists of a solid dielectric material such as silica including a distribution of regularly spaced patterns known as "holes". The holes are generally filled with air, but can consist of a dielectric material other than silica having a different, preferably lower, refractive index. The holes in a fiber take the form of tubes extending longitudinally along the fiber in the signal propagation direction. This kind of fiber structure is described in the paper "All silica single mode optical fiber with photonic crystal cladding" by J. C. Knight et al, Optical Letters, Vol. 21, No. 19, PP 1547–1549, Jan. 1, 1996.

In a fiber with holes, two light guiding mechanisms are used. One is guidance by total internal reflection, associated with the fact that the area including the holes has an index lower than that of silica, and the other is guidance by forbidden photonic bands, when the holes are disposed in accordance with a periodic structure and the periodicity of the structure is broken at the level of the core of the fiber.

The regular disposition of the holes in the silica makes this kind of structure similar to a crystal, referred to as a photonic crystal, whose characteristics are determined among other things by the spacing between the holes, i.e. the pitch, and by the rate of filling of the solid material by the holes, known as the air filling ratio, i.e. depends on the diameter of said holes.

Optical fibers with holes have beneficial chromatic dispersion, polarization maintenance and effective surface area properties, which makes them attractive as component fibers and as line fibers.

The fabrication of fibers with holes is based on a prior art technique of fabricating "microstructured" optical fiber. For example, European patent EP 0 810 453 B1 describes one method of fabricating this kind of fiber.

A silica rod forming a core is surrounded with capillary tubes and the resulting bundle is disposed in a preform. The fiber is then drawn from a heated end of the preform, the capillary tubes being sealed at the other end.

The geometry of the fiber with holes depends on the assembly of the capillary tubes around the central rod that forms the guiding part of the fiber. The preliminary fiber of the capillary tubes is therefore of primordial importance because it determines the diameter of the holes in the fiber, i.e. has a direct influence on the filling ratio as previously defined and thus on the guidance properties of the fiber obtained.

FIG. 1 is a diagrammatic view in section of a preform for producing a microstructured optical fiber.

The capillary tubes 12 are usually obtained by shrinking and drawing a tube, for example a silica or silicate tube, having an interior diameter tint and an exterior diameter $\phi_{ext}$ having a specific ratio φint/φext. For example, capillary tubes can be shrunk on a glassmaking lathe using a torch or a furnace, and drawing is effected conventionally in a fiber drawing tower. Shrinking and drawing can also be carried out simultaneously on a fiber drawing tower.

The resulting capillary tubes are then assembled in a bundle around the central rod 15 in the preform. The drawing conditions, such as the drawing temperature and speed, enable the ratio φint/φext to be modified and the final pitch Λ between the holes to be fixed.

Depending on the application, the central rod 15 can be of pure or doped silica, for example silica doped with dopants such as Ge, P, Al, La, Ga, Nb, Li or rare earth dopants such as Er, Yb, Ce, Tm, Nd.

The FIG. 2 graph shows the attenuation in a fiber with holes obtained by a method as previously described. The spectral attenuation AS(λ), expressed in dB per kilometer, is deduced from the following expression:

$$AS(\lambda) = 10 \log[P_L(\lambda) - P_l(\lambda)]/(l-L)]$$

in which:

$P_L$ is the power measured at the end of a "long length" L of fiber, and $P_l$ is the power measured at the end of a "short length" l of fiber, corresponding to one end of the section L.

Note the occurrence of high attenuation peaks at 950 nm, 1250 nm and 1390 nm, which are directly related to the presence of hydroxyl (OH) groups. This is because, during the fabrication process, hydroxyl groups form and are absorbed at the interfaces of the capillary tubes, leading to pollution of the fiber.

This pollution is well known to fiber fabricators, but in conventional fibers it is controlled and limited to a low level, in particular because the air-silica interface is far away from the area in which the signal propagates. On the other hand, in fibers with holes, the air-silica interfaces in contact with the propagation signal are multiplied, which causes high absorption peaks in the range of operating wavelengths.

The object of the present invention is to reduce the contribution of the peaks associated with the presence of hydroxyl groups in a fiber with holes.

To this end, the invention proposes to produce a self-cleaning layer within the capillary tubes that is adapted to react with the hydroxyl groups to evacuate them in the form of volatile substances.

SUMMARY OF THE INVENTION

To be more specific, the present invention provides a method of fabricating an optical fiber with microstructures, which method includes the steps of producing a plurality of capillary tubes by shrinking and drawing tubes, assembling capillary tubes around a central rod to form a bundle disposed in a preform, and drawing the bundle to form the fiber, and further includes a step of producing inside the capillary tubes a self-cleaning layer including molecules able to react with hydroxyl molecules to produce volatile gaseous substances.

In a first embodiment, the self-cleaning layer is produced on the interior surface of the capillary tubes after the fabrication of the tubes, for example by a vapor phase chemical deposition technique such as Modified Chemical Vapor Deposition (MCVD), Plasma Chemical Vapor Deposition (PCVD), or Surface Plasma wave Chemical Vapor Deposition (SPCVD), or by a sol-gel technique.

In a second embodiment, the self-cleaning layer is produced during the fabrication of the capillary tubes, by an evaporation and densification technique such as Outside Vapor Deposition (OVD) or Vapor Axial Deposition (VAD), or by a sol-gel technique.

According to one feature, the self-cleaning layer is produced from gaseous precursors including at least atoms of chlorine and/or fluorine.

The invention also provides an optical fiber with microstructures comprising a plurality of capillary tubes disposed around a central rod and including a self-cleaning layer comprising molecules able to react with hydroxyl molecules to produce volatile gaseous substances.

According to one feature of a fiber according to the invention, the self-cleaning layer includes at least atoms of chlorine and/or fluorine.

Depending on the embodiment, the self-cleaning layer is disposed on the interior surface of the capillary tubes or is incorporated into the material of the capillary tubes.

The features and advantages of the present invention will become more clearly apparent on reading the following description, which is given by way of illustrative and nonlimiting example and with reference to the accompanying drawings.

BRIEF DESCRIPTION OF THE DRAWINGS

FIG. 1, already described, is a diagrammatic section of a preform for a fiber with holes.

FIG. 2, already described, is a graph showing the attenuation of a fiber with holes as a function of wavelength.

FIGS. 3 and 4 show preforms for fibers with holes.

DETAILED DESCRIPTION OF THE PREFERRED EMBODIMENT

The method in accordance with the invention consists in fabricating an optical fiber with microstructures that has reduced attenuation caused by the adsorption of the optical signal by OH molecules absorbed by the silica during fabrication of the fiber.

The method includes a step of producing a plurality of capillary tubes of pure or doped silica having an interior diameter $\phi int$, an exterior diameter $\phi ext$ and a fixed ratio $\phi int/\phi ext$, for example, by a conventional method, previously described, of shrinking and drawing the tubes.

According to the invention, a self-cleaning layer is deposited inside the capillary tubes, comprising molecules able to react with the hydroxyl groups (OH) to produce gaseous substances that can be eliminated, for example $H_2O$, HCl or HF molecules. The presence of the self-cleaning layer allows evacuation of the hydroxyl groups generated during the fabrication of the fiber with holes. Furthermore, the self-cleaning layer can advantageously react with metal, for example ferrous, pollutants to produce volatile gaseous substances to be evacuated.

The self-cleaning layer includes elements able to react with hydroxyl groups, such as molecules of fluorine (F) and/or chlorine (Cl). The self-cleaning layer can be from 50 $\mu$m to 3 mm thick.

In a first embodiment, the self-cleaning layer can be deposited on the interior surface of the capillary tubes, for example by conventional chemical vapor phase deposition techniques such as modified chemical vapor deposition (MCVD), plasma chemical vapor deposition (PCVD), or surface plasma wave chemical vapor deposition (SPCVD). The self-cleaning layer is then deposited after the fabrication of the capillary tubes, before they are assembled into the bundle.

The self-cleaning layer can also be deposited by a conventional sol-gel technique, consisting in filling the tubes with a solution of alkoxide type precursors and draining the solution to leave a thin film deposit on the interior walls of the tubes.

In a second embodiment, the self-cleaning layer can be incorporated directly into the silica of the capillary tubes during the fabrication of said capillary tubes, for example by conventional vapor phase deposition and deposit densification techniques such as outside vapor deposition (OVD) or vapor axial deposition (VAD), or by a sol-gel technique creating a porous deposit that is densified during the fabrication of the tubes.

The self-cleaning layer is obtained by one of the techniques previously described from gaseous precursors including at least fluorine (F) and/or chlorine (Cl), such as $SiF_4$ and/or $C_2F_6$, for example.

The capillary tubes comprising a self-cleaning layer are then assembled around a central rod to form a bundle disposed in a preform for drawing the fiber using conventional techniques.

FIG. 3 shows a conventional preform 10 for use in a drawing and/or fiber drawing process for producing fibers with holes. The capillary tubes are disposed in a sleeve 11 and welded at one end by a solid weld 20 that blocks the holes. The tubes 12 remain open at the other end and are spot-welded to an exterior ring 21. A fiber drawing tail 22 is fixed to the closed ends of the tubes 12. After assembly, the sleeve 11 is degassed in a vacuum at a temperature of 1000° C.

The preform 10 is then drawn using conventional techniques (drawing puller on a fiber drawing tower) or directly fiber drawn. For this, the preform is maintained at ambient pressure during the formation of the droplet that closes the capillary tubes at the lower end of the preform and isolates the interior of the capillary tubes from the vacuum chamber. Drawing is effected in a vacuum through the intermediary of the pumping nipple 23, and this shrinks the interstices between the capillary tubes and the cavities between a sleeve 111 and the exterior tubes in the assembly.

FIG. 4 shows a preform 30 that can advantageously be used in a fiber drawing process to produce fibers with holes with a double cladding, with the holes in an internal cladding. The principal difficulty with this type of fiber is centering the cladding including the holes correctly relative to the external cladding.

This kind of fiber with holes with a double cladding is generally made in two stages, the first stage consisting in producing a core and the internal cladding, the one containing the holes, by the technique previously described, to form a stick 32, and the second stage consisting in placing the stick 32 in a new preform 30 for fiber drawing the external cladding.

In this case the preform 30 advantageously includes a vacuum chamber 33. The length of the sleeve 31 delimits the area of the preform that can be fiber drawn. The stick 32 is longer than the sleeve 31, which enables volatile gaseous substances formed by the reaction of the self-cleaning layer with the hydroxyl groups or the metal pollutants to migrate during fiber drawing to the upper part of the preform, which remains at ambient temperature.

The stick 32 is closed at both ends to maintain an excess internal pressure in the holes in the internal cladding already drawn at the time of fiber drawing. The external cladding is then fiber drawn in a vacuum, which presses the external cladding strongly against the internal cladding and perfectly centers the core of the fiber.

What is claimed is:

1. A method of fabricating an optical fiber with microstructures, which method includes the steps of producing a plurality of capillary tubes by shrinking and drawing tubes, assembling capillary tubes around a central rod to form a bundle disposed in a preform, and drawing said bundle to form said fiber, and further includes a step of producing inside said capillary tubes a self-cleaning layer including molecules able to react with hydroxyl molecules to produce volatile gaseous substances.

2. The method claimed in claim 1 wherein said self-cleaning layer is produced on the interior surface of said capillary tubes after the fabrication of said tubes.

3. The method claimed in claim 2 wherein said self-cleaning layer is deposited by a vapor phase chemical deposition technique such as Modified Chemical Vapor Deposition (MCVD), Plasma Chemical Vapor Deposition (PCVD), or Surface Plasma wave Chemical Vapor Deposition (SPCVD).

4. The method claimed in claim 2 wherein said self-cleaning layer is produced by a sol-gel technique.

5. The method claimed in claim 1 wherein said self-cleaning layer is produced during the fabrication of said capillary tubes.

6. The method claimed in claim 5 wherein said self-cleaning layer is produced by an evaporation and densification technique such as Outside Vapor Deposition (OVD) or Vapor Axial Deposition (VAD).

7. The method claimed in claim 5 wherein said self-cleaning layer is produced by a sol-gel technique.

8. The method claimed in claim 1 wherein said self-cleaning layer is produced from gaseous precursors including at least atoms of chlorine and/or fluorine.

9. An optical fiber with microstructures comprising a plurality of capillary tubes disposed around a central rod and including a self-cleaning layer including molecules able to react with hydroxyl molecules to produce volatile gaseous substances.

10. The optical fiber claimed in claim 9 wherein said self-cleaning layer includes at least atoms of chlorine and/or fluorine.

11. The optical fiber claimed in claim 9 wherein said self-cleaning layer is disposed on the interior surface of said capillary tubes.

12. The optical fiber claimed in claim 9 wherein said self-cleaning layer is incorporated into the material of said capillary tubes.

13. The optical fiber claimed in claim 9 wherein said self-cleaning layer is from 50 $\mu$m to 3 mm thick.

14. The optical fiber claimed in claim 9 wherein said central rod is made of pure or doped silica.

15. The optical fiber claimed in claim 9 wherein said capillary tubes are made of pure or doped silica.

* * * * *